United States Patent
Ueda

(10) Patent No.: US 9,025,194 B2
(45) Date of Patent: May 5, 2015

(54) DATA TRANSMISSION APPARATUS FOR TRANSFERRING DATA TO AN OUTPUT DEVICE FOR OUTPUTTING DATA, PRINTER, INFORMATION PROCESSING APPARATUS, AND CONTROL METHOD THEREOF

(75) Inventor: Koichi Ueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 13/295,612

(22) Filed: Nov. 14, 2011

(65) Prior Publication Data

US 2012/0140286 A1    Jun. 7, 2012

(30) Foreign Application Priority Data

Dec. 1, 2010   (JP) ................................ 2010-268753
Mar. 10, 2011  (JP) ................................ 2011-053558

(51) Int. Cl.
 *G06K 15/00*   (2006.01)
 *G06F 1/32*    (2006.01)
 *G06K 15/02*   (2006.01)

(52) U.S. Cl.
 CPC ............ *G06F 1/3284* (2013.01); *G06F 1/3228* (2013.01); *G06K 15/1817* (2013.01); *G06K 15/4055* (2013.01); *Y02B 60/1267* (2013.01); *Y02B 60/32* (2013.01)

(58) Field of Classification Search
 None
 See application file for complete search history.

(56) References Cited

U.S. PATENT DOCUMENTS

| | | | | |
|---|---|---|---|---|
| 8,607,075 | B2 | 12/2013 | Gough et al. | 713/300 |
| 2006/0171300 | A1 | 8/2006 | Oshikiri et al. | |
| 2006/0236139 | A1* | 10/2006 | Chang et al. | 713/300 |
| 2007/0136522 | A1 | 6/2007 | Umemura et al. | 711/113 |
| 2009/0174455 | A1* | 7/2009 | Dimitriu et al. | 327/295 |
| 2009/0213033 | A1* | 8/2009 | Chen | 345/1.1 |
| 2010/0169685 | A1* | 7/2010 | Gough et al. | 713/323 |
| 2012/0044542 | A1* | 2/2012 | Nagano | 358/448 |
| 2014/0101470 | A1 | 4/2014 | Gough et al. | 713/320 |

FOREIGN PATENT DOCUMENTS

| | | | |
|---|---|---|---|
| JP | 2000-181584 A | 6/2000 | |
| JP | 2006-201909 A | 8/2006 | |
| JP | 2006-276978 A | 10/2006 | |

(Continued)

OTHER PUBLICATIONS

Tomine Toru, JP 2008197948 A, Machine Translation of provided prior art reference.*

(Continued)

*Primary Examiner* — Miya J Cato
(74) *Attorney, Agent, or Firm* — Fitzpatrick, Cella, Harper & Scinto

(57) ABSTRACT

To reduce power consumption, a data transmission apparatus comprises: a memory; a timing instruction unit which indicates a start timing of outputting data from the memory; a first interface which outputs data stored in the memory according to the timing instruction unit; a second interface which transfers the data from the first interface to a buffer; and a control unit which issues a command to perform transition of the first interface and the second interface to a power saving state based on the data output start timing indicated by the timing instruction unit, and a sum of a time required to perform transition of the first interface and the second interface to the power saving state and a time required to return from the power saving state.

16 Claims, 10 Drawing Sheets

(56) References Cited

FOREIGN PATENT DOCUMENTS

| JP | 2007-157011 A | | 6/2007 |
|---|---|---|---|
| JP | 2008-070609 A | | 3/2008 |
| JP | 2008-197948 A | | 8/2008 |
| JP | 2008197948 A | * | 8/2008 |
| JP | 2010-140151 A | | 6/2010 |
| JP | 2010-165349 A | | 7/2010 |

OTHER PUBLICATIONS

Budruk, R., et al., "PCI Express System Architecture", Addison-Wesley, Sep. 4, 2003, pp. 567-645.

Satomi, T., "Summary of the PCI Express Standard", Interface, Jul. 2003, pp. 80-92.

* cited by examiner

DATA TRANSMISSION APPARATUS FOR TRANSFERRING DATA TO AN OUTPUT DEVICE FOR OUTPUTTING DATA, PRINTER, INFORMATION PROCESSING APPARATUS, AND CONTROL METHOD THEREOF

BACKGROUND OF THE INVENTION

1. Field of the Invention

The present invention relates to a data transfer technique and, more particularly, to a data transmission apparatus for transferring data to an output device for outputting (for example, printing or displaying) digital image data.

2. Description of the Related Art

In recent years, the resolution of an image output from a digital image processing apparatus has become higher, and the data rate has increased. Since a last output unit always needs to output image data at a given interval, it requires a buffer memory.

On the other hand, in recent years, a high speed connection standard has been defined for inter-chip connection. Japanese Patent Laid-Open No. 2006-201909 (patent literature 1), for example, has proposed a data transfer method using PCI Express as a high speed connection standard.

In PCI Express, a plurality of link states, that is, L0, L0s, L1, and L2 are defined to reduce power consumption. An overview of the link states is described in, for example, "PCI Express System Architecture" (ISBN: 0-321-15630-7) (Addison-Wesley, 2003), pp. 567-645. The L0 state indicates a normal state, and the L0s to L2 states indicate a power saving state. The power consumption lowers in the order from L0s to L2. Patent literature 1 disclosed a technique of setting each packet interval in a series of transfer operations started with line synchronization to be equal to or shorter than a transition time to the power saving state L0s, which has been defined in the PCI Express standard, in a system for transferring image data in synchronism with a line synchronization signal or frame synchronization signal. This suppresses unnecessary transition to L0 during a series of data transfer operations, and improves the power saving effect by prolonging the total time of the power saving state (L0s).

Since the method described in patent literature 1 uses the L0s state, in which the power saving effect is relatively low, of the power saving states defined in the PCI Express standard, it cannot be expected to significantly improve the power saving effect. Furthermore, since power saving transition defined in the PCI Express standard is based on a period of time during which a state (=a logically idle state) wherein data transfer is not performed is maintained, a relatively long time is required to transit to a power saving state after data transfer is completed.

The present invention provides a technique of causing a data transmission apparatus to efficiently transit, while data transfer is not performed, to a state in which the power saving effect is higher.

SUMMARY OF THE INVENTION

According to one aspect of the present invention, a data transmission apparatus comprises: a memory; a timing instruction unit which indicates a start timing of outputting data from the memory; a first interface which outputs data stored in the memory according to the timing instruction unit; a second interface which transfers the data from the first interface to a buffer; and a control unit which issues a command to perform transition of the first interface and the second interface to a power saving state based on the data output start timing indicated by the timing instruction unit, and a sum of a time required to perform transition of the first interface and the second interface to the power saving state and a time required to return from the power saving state.

According to another aspect of the present invention, a data transmission apparatus comprises: a memory; an issuance unit which issues a signal indicating a start timing of outputting data from the memory; an interface which outputs data stored in the memory based on the signal issued by the issuance unit; and a control unit which controls transition to a power saving state in the interface based on the data output start timing indicated by the signal and a state transition required time associated with the power saving state in the interface.

According to still another aspect of the present invention, a printer which includes a data control unit that has a memory control unit for storing and managing data, and a data output unit that is connected with the data control unit via an inter-chip bus to output data from the data control unit, the data control unit comprises a timing instruction unit which indicates a start timing of outputting data from a memory, a first interface which outputs the data stored in the memory according to the timing instruction unit, and a control unit which issues a command to perform transition of the first interface and the data output unit to a power saving state based on the data output start timing indicated by the timing instruction unit, a first required time required to perform transition of the first interface and the data output unit to the power saving state, and a second required time required to return the first interface and the data output unit from the power saving state, and the data output unit comprises a buffer which stores the data from the data control unit, a second interface which transfers the data from the first interface to the buffer, and a third interface which outputs the data stored in the buffer for printing.

According to yet another aspect of the present invention, a control method for a data transmission apparatus which includes a memory, a first interface, and a second interface, comprises: indicating a start timing of outputting data from the memory; causing the first interface to output data stored in the memory based on the start timing; causing the second interface to transfer the data from the first interface to a buffer; and issuing a command to perform transition of the first interface and the second interface to a power saving state based on the data output start timing indicated in the indicating, a first required time required to perform transition of the first interface and the second interface to the power saving state, and a second required time required to return the first interface and the second interface from the power saving state.

According to still yet another aspect of the present invention, a control method for a printer which includes a data control unit that has a memory control unit for storing and managing data, and a data output unit that is connected with the data control unit via an inter-chip bus to output data from the data control unit, wherein the data control unit executes indicating a start timing of outputting data from a memory, outputting the data stored in the memory based on the start timing indicated in the indicating, and issuing a command to perform transition of the data control unit and the data output unit to a power saving state based on the data output start timing indicated in the indicating, a first required time required to perform transition of the data control unit and the data output unit to the power saving state, and a second required time required to return the data control unit and the data output unit from the power saving state, and the data output unit executes storing the data from the data control unit in a buffer, transferring the data from the data control unit to the buffer, and outputting the data stored in the buffer for printing.

According to yet still another aspect of the present invention, a control method for an information processing apparatus which includes a memory, an issuance unit for issuing a signal indicating a start timing of outputting data from the memory, and an interface for outputting data stored in the memory based on the signal issued by the issuance unit, the method comprises:controlling transition to a power saving state in the interface based on the data output start timing indicated by the signal, and a state transition required time associated with the power saving state in the interface.

According to still yet another aspect of the present invention, an information processing apparatus for processing data transferred from a data control apparatus, comprises: a request unit which requests the data control apparatus to transfer data; an output unit which processes and sequentially outputs the transferred data; a calculation unit which calculates, based on a transfer amount of data requested by the request unit and an output rate output by the output unit, a first time from when the transfer operation is completed until a next transfer operation starts; a comparison unit which compares the first time with a second time obtained by calculating a sum of a time required to perform transition of an inter-chip bus connected with the data control apparatus to a power saving state and a time required to return from the power saving state; and a changing unit which performs, when the comparison unit determines that the first time is longer than the second time, transition of the inter-chip bus to the power saving state.

According to yet still another aspect of the present invention, a control method for an information processing apparatus which processes data transferred from a data control apparatus, comprises: requesting the data control apparatus to transfer data; processing and sequentially outputting the transferred data; calculating, based on a transfer amount of data requested in the requesting and an output rate output in the outputting, a first time from when the transfer operation is completed until a next transfer operation starts; comparing the first time with a second time obtained by calculating a sum of a time required to perform transition of an inter-chip bus connected with the data control apparatus to a power saving state and a time required to return from the power saving state; and performing, when it is determined in the comparing that the first time is longer than the second time, transition of the inter-chip bus to the power saving state.

A data transmission apparatus according to the present invention can efficiently transit, while data transfer is not performed, to a state in which the power saving effect is higher.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An overview of power saving management in PCI Express (to be referred to as PCIe hereinafter) will be described first.

Figures 6, 7:
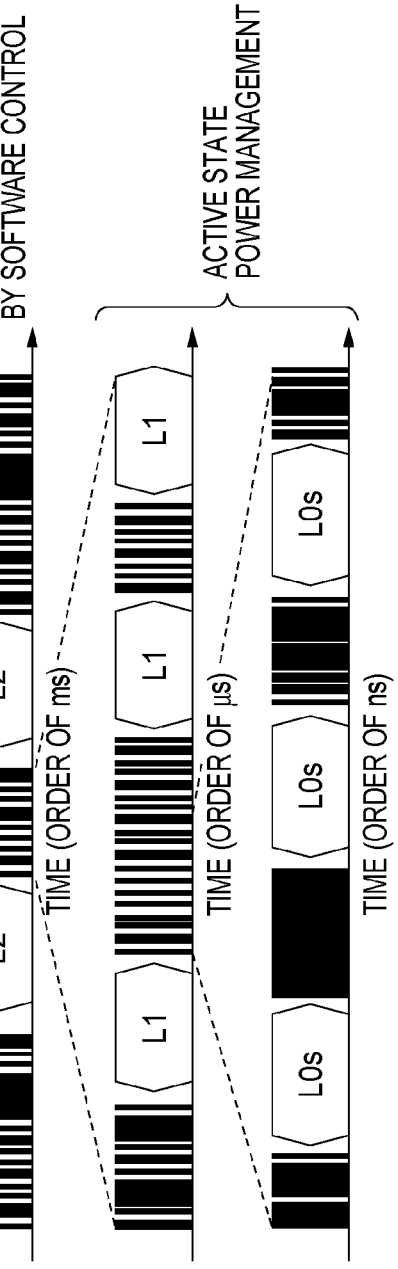
FIG. 6 is a table showing the definition of link states in PCI Express.
FIG. 7 is a timing chart showing active state power supply management control.

In PCIe, L0, L0s, L1, and L2 link states are defined to reduce power consumption, as shown in FIG. 6. The L0 state indicates a normal mode, and power consumption lowers in the order from L0s to L2 to achieve a higher power saving effect. FIG. 7 is a timing chart showing the L2, L1, and L0s states and a data transfer state (normal state). Transition to a power saving mode of the L2 state (let "L2" be the time required for the transition) is performed by software control on the order of milliseconds (ms). On the other hand, transition to a power saving mode of the L1 state (let "L1" be the time required for the transition) is performed by hardware control on the order of microseconds ($\mu$s), and transition to a power saving mode of the L0s state (let "L0s" be the time required for the transition) is performed by hardware control on the order of nanoseconds (ns).

A time is required to transit to a power saving mode of the L0s, L1, or L2 state, and to return from the power saving mode to the L0 state (normal mode). For the L0s state whose transition and return time is shortest, the return time is 16 ns to 4 $\mu$s. The PCIe standard defines, as a condition for transiting to each of the power saving states that a state (logically idle state) in which no communication exists on a link lasts for a device-specific time.

An overview of transition to the L1 state and return from the L1 state will now be explained. Transition to the active state power management (to be referred to as ASPM hereinafter) L1 state by hardware control starts in response to a request from a downstream component (a receiving side in this example). A downstream component which is to start transition to ASPM_L1 transmits an L1 transition request (a data link layer packet defined as PM_Active_State_Request_L1) to an upstream component (the transmitting side in this example).

When the upstream component accepts the L1 transition request, it transmits an acknowledgement (a data link layer packet defined as PM_Request_Ack) to the downstream component. Upon receiving the acknowledgement, the downstream component performs transition of a link to an electrically idle state. The upstream component acknowledges that the link (with the downstream component) has transited to an electrically idle state, and then transits to an electrically idle state (a state in which the component outputs a direct voltage within a range defined as a DC common mode voltage to a TX serving as an operating output and both the terminals of the TX). With the above-described sequence, the state transition to the L1 state is completed.

The standard defines that the upstream component or downstream component can start return from the L1 state. The standard defines that a component which is to make communication via a link in the L1 state starts communication after returning its transmitting side to the L0 state. The standard also defines a procedure of returning from the L1 state to the L0 state.

(First Embodiment)

Figure 1:
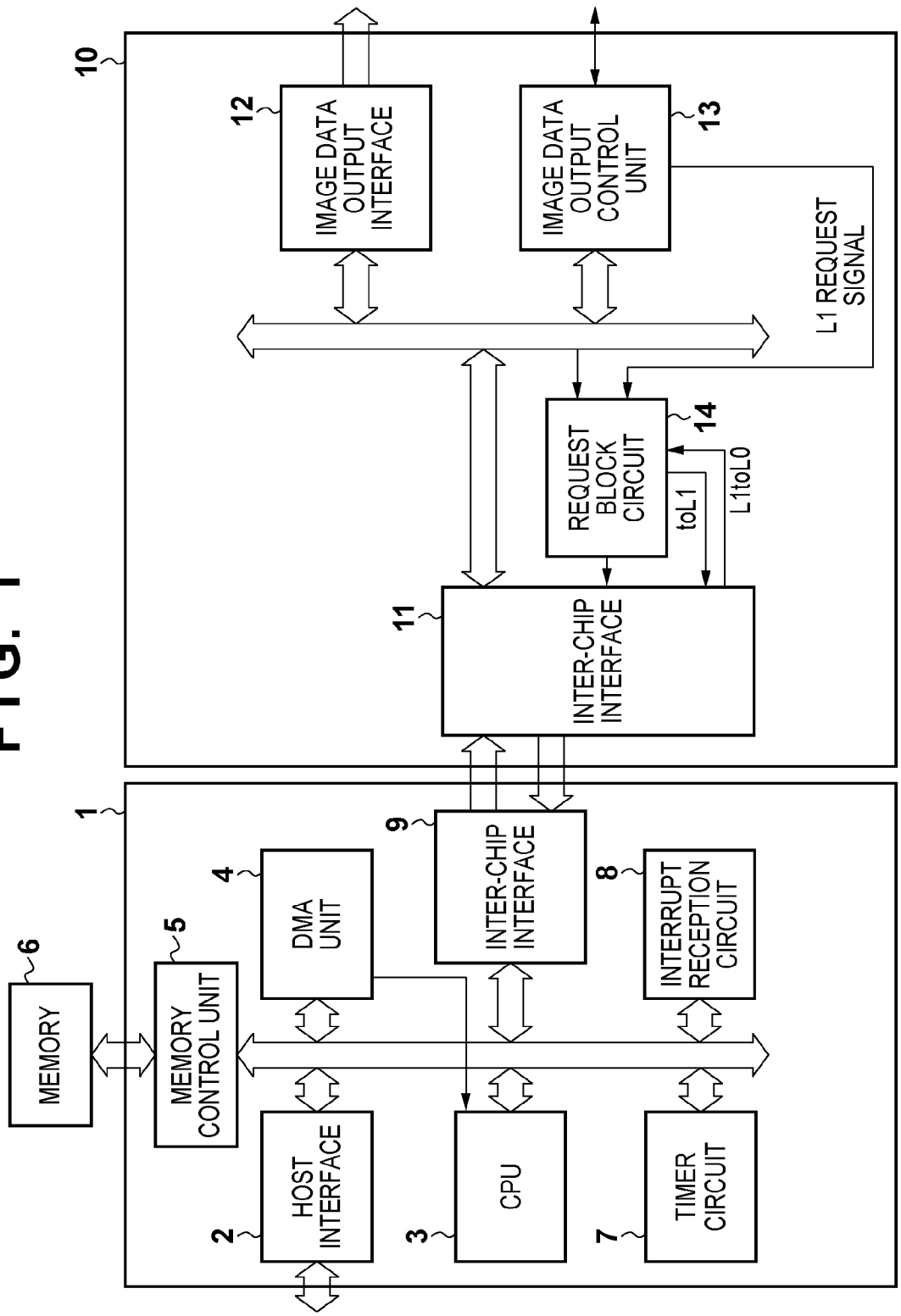
FIG. 1 is a block diagram schematically showing a data transmission apparatus as a whole according to the present invention.

FIG. 1 is a block diagram schematically showing an information processing apparatus (printer) as a whole according to the first embodiment of the present invention. Referring to FIG. 1, reference numeral 1 denotes a data control unit for receiving print data from a host computer (not shown) and storing it. The data control unit 1 functions as the data transmitting side in this embodiment. Reference numeral 2 denotes a host interface which communicates with the host computer; 3, a central processing unit (to be referred to as a CPU hereinafter) which controls the whole printer; 4, a direct memory access unit (to be referred to as a DMA unit hereinafter) which transfers data from the data control unit 1 to an image data output unit 10 (to be described later) (which functions as the receiving side in the present invention); 5, a memory control unit; 6, a memory device controlled by the memory control unit 5; 7, a timer circuit (a timing instruction unit) which measures an interval and sends a notification of a start timing of outputting data stored in the memory device 6; 8, an interrupt reception circuit which receives a timing signal from the image data output unit 10; and 9, an inter-chip interface (the first interface) used for inter-chip bus connection on the data control unit 1 side. The image data output unit 10 actually controls print processing. Reference numeral 11 denotes an inter-chip interface (the second interface) (to be referred to as an inter-chip IF hereinafter) which connects with the inter-chip bus on the image data output unit side; 12, an image data output interface (the third interface) which outputs image data to a print engine (not shown); 13, an image data output control unit which controls each circuit and the print engine of the image data output unit 10; and 14, a request block circuit which blocks an access request to the data control unit 1 using the inter-chip IF 11 from the image data output unit 10.

Figure 2:
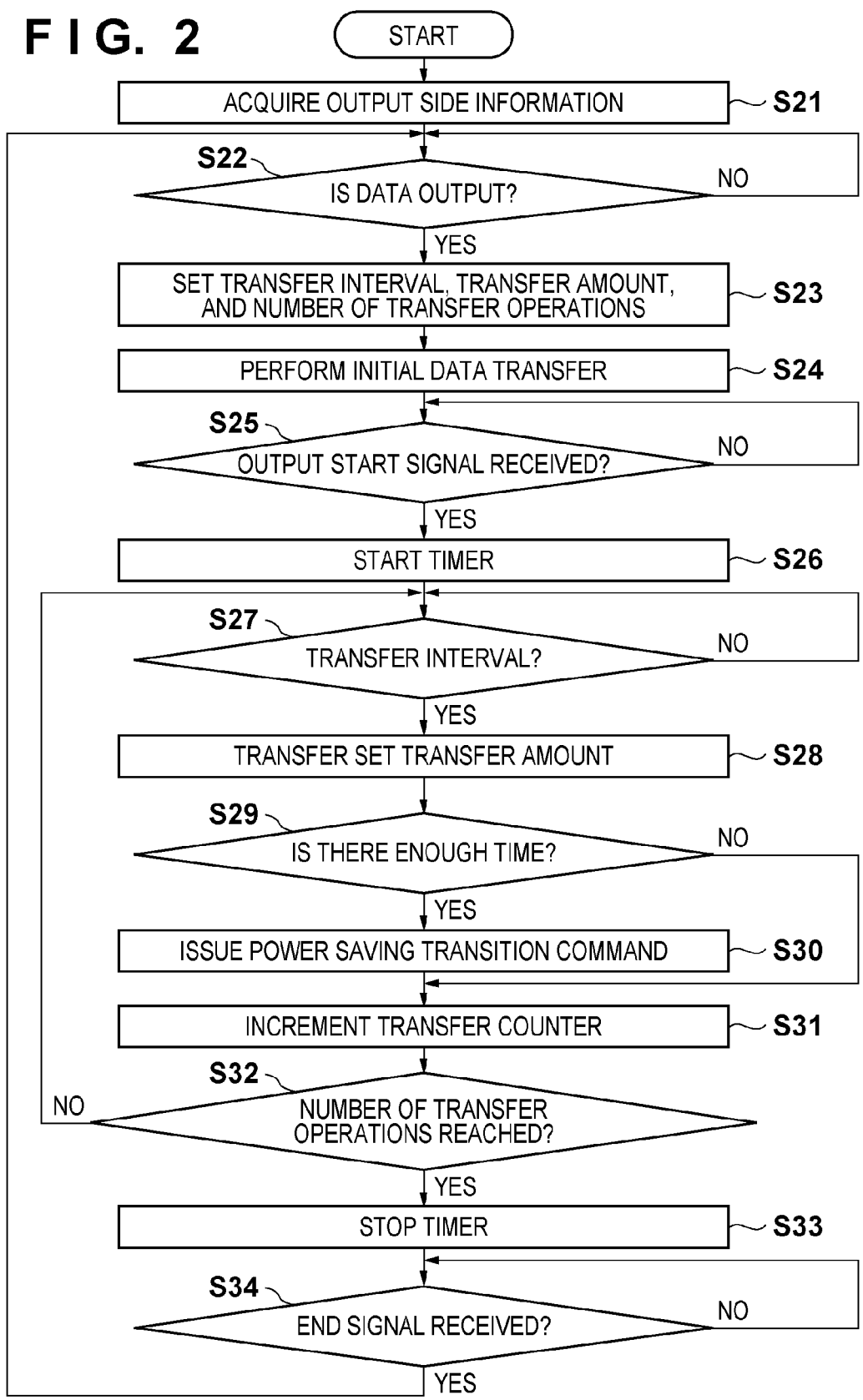
FIG. 2 is a flowchart for explaining an overview of an operation on a transmitting side according to the present invention.
Figure 3:
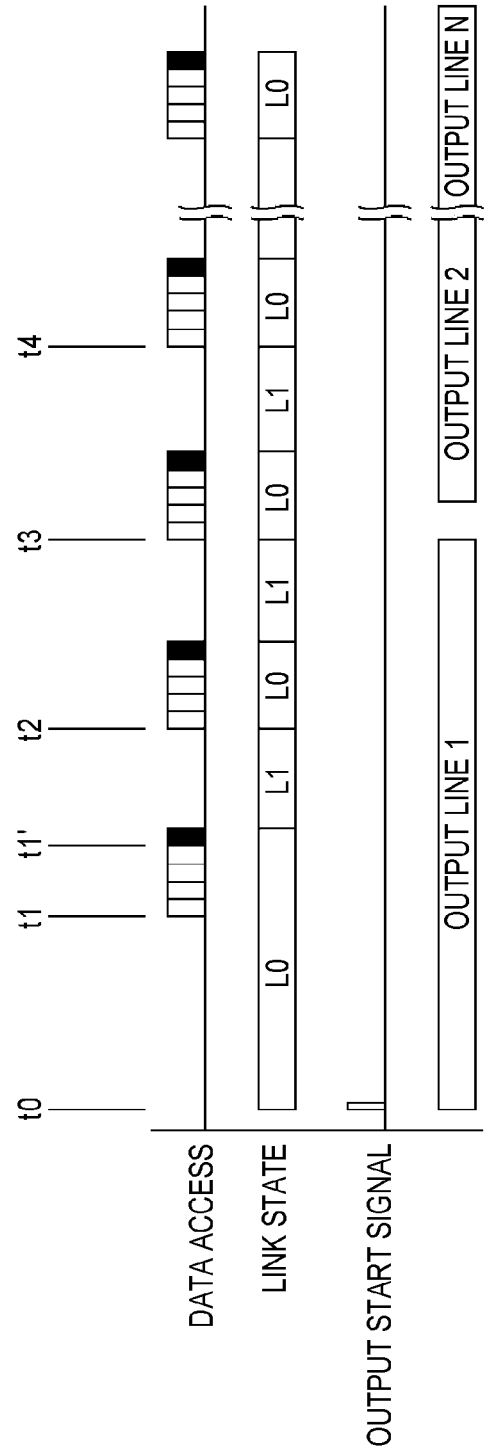
FIG. 3 is a timing chart showing a timing signal from an image data output unit 10 and the reception state of a data control unit 1.

FIG. 2 is a flowchart illustrating the processing of the data control unit 1. FIG. 3 shows a timing signal from the image data output unit 10 and the reception state of the data control unit 1.

The operation of the data control unit 1 of this embodiment will be described with reference to FIG. 2. In initializing a printer system, the data control unit 1 acquires information about the image data output unit 10 from the image data output unit 10 (S21). The acquired information is data specific to the image data output unit 10, which includes information such as the size of the image buffer and the image output data rate of the image data output interface 12, the time (the first required time) required to transit to a power saving state, and the time (the second required time) required to return from the power saving state.

Before the image data output unit 10 starts outputting image data, the data control unit 1 calculates, based on the data acquired from the image data output unit 10, a data amount which can be stored in the image data output unit 10. Then, the unit 1 determines an interval at which the data control unit 1 transfers data to the image data output unit 10, and a data size (the second data transfer amount) to be transferred by one normal transfer operation.

Upon receiving a print instruction from the host computer (not shown) via the host interface 2, the data control unit 1 determines that data is output (YES in step S22). The data control unit 1 calculates and sets a transfer interval, a data transfer amount by one data transfer operation, and the number of data transfer operations based on a page data amount (S23). In this embodiment, the CPU 3 sets the transfer interval in the timer circuit 7, and sets the data transfer amount in the DMA unit 4. The CPU 3 stores the number of data transfer operations. After making these settings, the data control unit 1 performs initial data transfer to the image data output unit 10, and instructs the image data output unit 10 to start output (printing) of image data (S24).

It is possible to determine, based on the information acquired in step S21, a data transfer amount (the first data transfer amount) to be transferred by the initial data transfer according to $$\text{initial data transfer amount image} \leq \text{data buffer size}$$

Similarly, the transfer interval is determined by $$\text{transfer interval} \leq \text{image data buffer size/image output data rate}$$

Since, in fact, a delay occurs due to data transfer between the chips, it is necessary for the transfer interval to have an enough margin. The transfer amount (the second data transfer amount) transferred by one data transfer operation is determined by $$\text{transfer amount} = \text{image output data rate} * \text{transfer interval}$$

In fact, in consideration of a transfer size defined by a parameter Max_Payload_Size set by the software of the inter-chip IF, a combination of a transfer amount and a transfer interval is determined. When the transfer amount is obtained, the number of transfer operations (the number of DMA unit start operations necessary to transfer data for one page) is calculated based on the data size of an output page by $$\text{number of transfer operations} * \text{transfer amount page data size}$$

The data control unit 1 makes settings as described above, starts image data output processing of the image data output interface 12, and stands by for an output start signal indicating the start of image output (S25). The interrupt reception circuit 8 can receive the output start signal using inter-chip communication. Upon receiving the output start signal, the interrupt reception circuit 8 sends an interrupt signal to the CPU 3. Upon receiving the interrupt notification, the CPU 3 instructs the timer circuit 7 to start a count operation (S26).

The timer circuit 7 sends a notification at an interval corresponding to the preset transfer interval (S27). This notification may be directly used as a start signal of the DMA unit 4, or may be input to the CPU 3 as an interrupt signal to start the DMA unit 4 by software. Upon being started by the timer circuit 7 or CPU 3, the DMA unit 4 transfers the preset transfer amount of data (S28). After transferring the transfer amount of data, the DMA unit 4 issues a power saving transition command to the image data output control unit 13 via the inter-chip IFs 9 and 11 to perform transition of the inter-chip IFs 9 and 11 to a power saving state.

In this embodiment, every time the DMA unit 4 completes transfer of the transfer amount of data, the CPU 3 is notified of it. Every time the CPU 3 receives a notification, it issues a command. However, the DMA unit 4 may directly issue a command. When the CPU 3 receives a notification from the DMA unit 4, if a time until a next transfer operation starts is equal to or longer than the time required to perform transition/return of the inter-chip IFs 9 and 11 to/from a power saving state, the CPU 3 determines that there is enough time to transit to a power saving mode (YES in step S29).

The data control unit 1 issues a power saving transition command (S30), and increments a transfer counter by 1 (S31). The unit compares the preset number of transfer operations (the previously calculated number of transfer operations) with the value of the transfer counter, and checks whether transfer of a predetermined amount of data is complete (S32).

If transfer of a predetermined amount of data is not complete (NO in step S32), the process returns to step S27 to stand by until a next transfer operation starts. Even if the transfer is complete, when a standby time until a next data transfer operation starts is shorter than the time required to transit to a power saving state and return from the power saving state, the unit 1 does not issue a power saving command but increments the transfer counter. Note that if transfer of a predetermined amount of data is complete, the unit 1 stops the count operation of the timer circuit 7 (S32), and stands by for reception of a data output end signal from the image data output interface 12 (S33). The interrupt reception circuit 8 can receive this signal, and handle it as an interrupt signal for the CPU 3.

In this embodiment, a series of data transfer operations is started at an interval set by the timer circuit 7. The time (the first required time) required to transit to a power saving state and the time (the second required time) required to return from the power saving state have been acquired in advance from the image data output unit 10. It is, therefore, possible to readily make an interval determination whether to transit to a power saving state by checking information indicating the remaining time of the timer circuit 7, and performing a comparison. By configuring the timer circuit 7 to include a down counter, send a notification every time a set transfer interval is counted down to reach 0, and count down the reset transfer interval again, it is possible to readily acquire the remaining time from the timer circuit 7. (Note that the timer circuit 7 may include an up counter. In this case, as a count value becomes larger, the remaining time is considered to be shorter.)

In the image data output unit 10, the image data transferred from the data control unit 1 is transferred to a buffer within the image data output interface 12 via the inter-chip IF 11. On the other hand, the power saving transition command is transferred to the image data output control unit 13, which then outputs it as an L1 request signal to the request block circuit 14.

The request block circuit 14 has a function of blocking, depending on a mode, a communication request from each module of the image data output unit 10 to the data control unit 1. The request block circuit 14 outputs to the inter-chip IF 11 a transition instruction signal for performing transition of the inter-chip IF 11 to the L1 state. In this embodiment, the image data output control unit 13 and the request block circuit 14 function as a power saving transition command interface.

FIG. 3 is a timing chart showing various signals associated with the data control unit 1 after receiving an output start signal in step S25 of FIG. 2. Referring to FIG. 3, at a time t0, the data control unit 1 receives an output start signal from the image data output unit 10, and starts the timer circuit 7. At a time t1, the timer circuit 7 counts a set time, and sends a notification to the DMA unit 4. In response to the notification sent from the timer circuit 7, the DMA unit 4 transfers a set transfer amount of data. When the transfer ends, the DMA unit 4 notifies the CPU 3 of it.

Upon receiving the completion notification indicating completion of the data transfer, the CPU 3 reads out, from the timer circuit 7, a time until a next transfer operation starts, and compares it with the time required to perform power saving transition and return, which has been read out in advance from the image data output unit 10. If the time until the next transfer operation starts is longer than the time required for transition and return, the CPU 3 issues a power saving transition command to the image data output control unit 13 (t1'). The image data output control unit 13 receives the power saving transition command from the CPU 3, and sends the command (acknowledgement) to the inter-chip IF 11 via the request block circuit 14. The inter-chip IF 11 transits to a low power consumption state (the L1 state) according to the PCIe standard. Although FIG. 3 shows transition to the L1 state, further transition to a power saving state may be performed if the remaining time until the next transfer operation starts is sufficiently long.

When the timer circuit 7 counts the set time, and sends a notification to the DMA unit 4 (t2), the DMA unit 4 starts transfer of the set transfer amount of data. The inter-chip IF 9 on the transmitting side which has received a data transfer request starts a sequence of returning from the power saving state according to the PCIe standard. Along with this, the inter-chip IF 11 on the receiving side starts a sequence of returning from the power saving state according to the PCIe standard. Both the inter-chip IFs 9 and 11 return to a normal state (the L0 state) (re-establish a link). Then, the inter-chip IF 9 on the transmitting side which has received the request from the DMA unit 4 transfers data via the inter-chip IFs 9 and 11 based on the received request.

The request block circuit 14 of the image data output unit 10 will be described in detail next. PCIe has defined that either side (transmitting side or receiving side) may start return from the low power consumption state L1 to the normal state L0. Unless communication from the image data output unit 10 to the data control unit 1 via the inter-chip IF 11 is limited, it may be impossible to obtain a sufficient power saving effect. The request blocks circuit 14, therefore, blocks a communication request (a request other than a request to transit to a power saving state) from the image data output unit 10 to the inter-chip IF 11.

Figure 4:
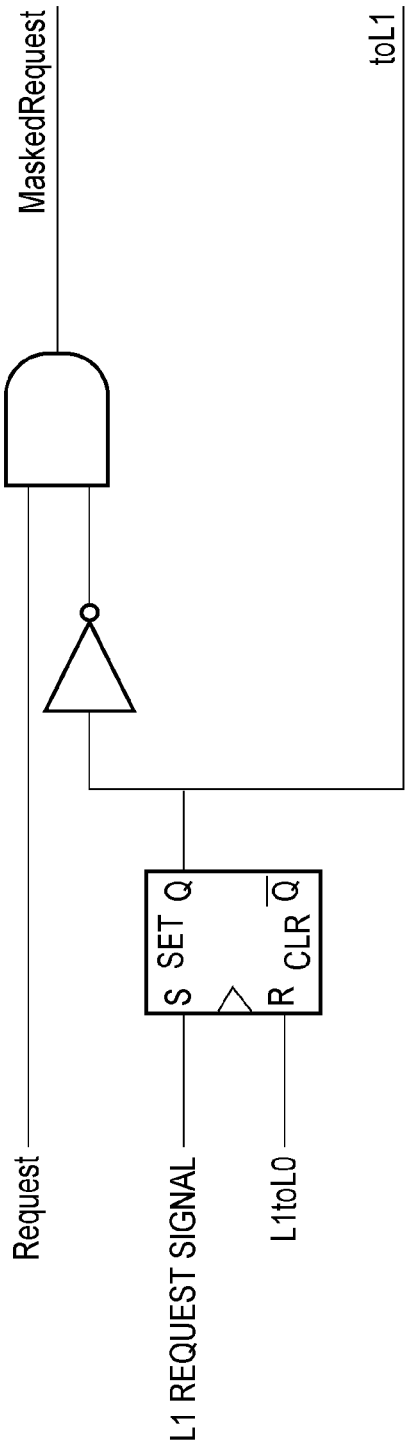
FIG. 4 is a circuit diagram showing the arrangement of a request block circuit.

FIG. 4 shows details of the request block circuit. The image data output control unit 13 of the image data output unit 10 receives the power saving transition command issued by the data control unit 1, and sends it as an L1 request signal to the request block circuit 14. The request block circuit 14 stores the signal in an RS flip-flop, and gives it as a L1 transition request signal (a toL1 signal) to the inter-chip IF 11.

A signal (Request signal) for requesting a communication request via the inter-chip IF 11 undergoes mask processing using the toL1 signal to be converted into a signal (a MaskedRequest signal) which looks as if there is no request until return to the L0 state is completed. When the inter-chip IF 11 receives a signal (L1toL0 signal) indicating that transition to the L1 state and return to the L0 state have been performed, it cancels the toL1 signal stored in the RS flip-flop.

Figure 5:
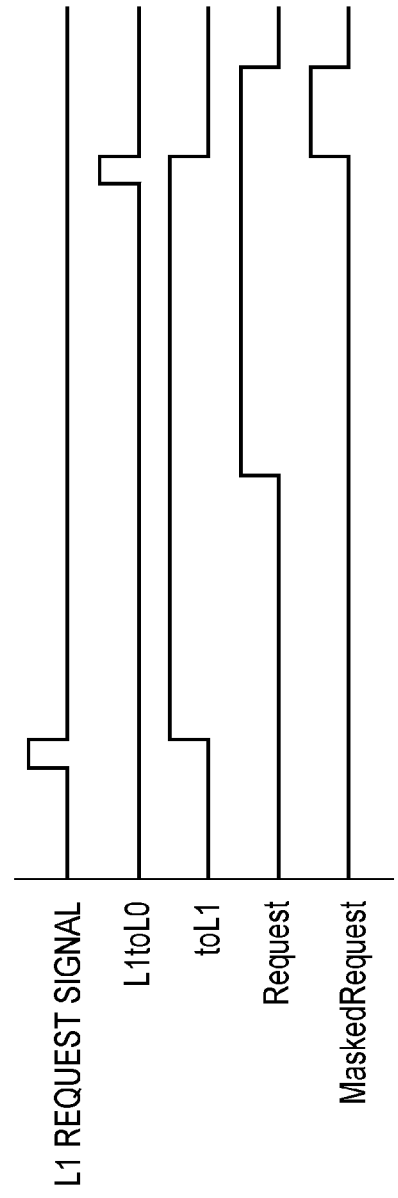
FIG. 5 is a timing chart showing signal transition associated with the request block circuit.

FIG. 5 is a timing chart for explaining the above operations. Referring to FIG. 5, even if a communication request (Request) to make communication via the inter-chip IF occurs while an L1 request signal issues a toL1 signal (during the L1 state), the communication request is masked until the L1 state is cancelled by a return request (L1toL0).

In the above-described embodiment, it is possible to acquire a transfer amount based on the image data output rate of the image data output unit 10. Furthermore, it is possible to determine whether to transit to a power saving state by reading out the remaining time of the timer circuit 7 after the CPU 3 receives a transfer completion notification from the DMA unit 4, and comparing the remaining time with a value indicating the power saving required time. Note that the approximate time required for a power saving state transition/return in PCIe may be stored in a register (not shown) within the data control unit for each power saving state (L0s, L1, or L2), and the CPU 3 may issue a command to cause the image data output unit 10 to transit to a power saving state based on the total of the approximate times read out from the register.

In the above-described embodiment, the first required time and the second required time are individually acquired from the image data output interface 12. However, a total of the first required time and the second required time may be registered in advance in the image data output interface 12 as a power saving required time taken for ASPM, and the data control unit 1 may acquire the power saving required time, and execute the processing of the above-described embodiment.

Although the above-described embodiment has been explained according to the PCIe standard, it is possible to obtain the same effects by applying the present invention according to another standard.

(Second Embodiment)

An embodiment especially when PCI Express is used as a high speed interface used for inter-chip connection will be described in detail with reference to the accompanying drawings. The receiving side has a command interface for performing transition of an inter-chip interface to a power saving state, and executes, upon completion of data transfer from a transmitting side to the receiving side, a command to perform transition of the receiving side to a low power consumption state. Furthermore, the receiving side is configured to issue such a command when an interval for starting data transfer is constant, or when it is possible to predict a next data transfer start time and the time until a next data transfer operation starts is longer than the time required to transit to a power saving state.

Figure 8:
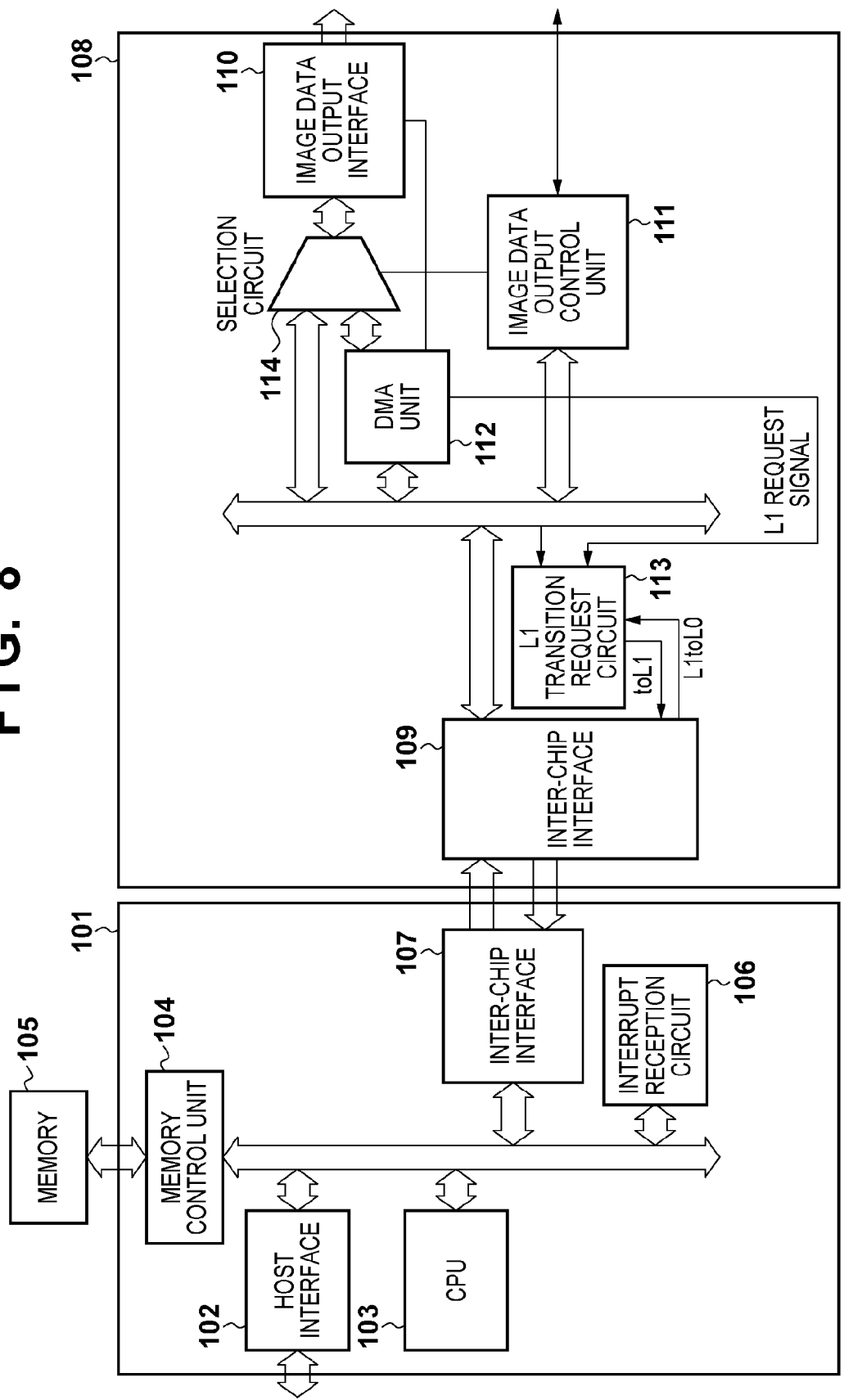
FIG. 8 is a block diagram schematically showing a data transfer system as a whole.

FIG. 8 is a schematic block diagram when the present invention is applied to a printer.

A data control apparatus 101 receives print data from a host computer (not shown), and stores it. The data control apparatus 101 includes a host interface 102, a CPU 103, a memory control unit 104, an interrupt reception circuit 106, and an inter-chip interface 107.

The host interface 102 communicates with the host computer (not shown).

The CPU 103 controls each component. The memory control unit 104 controls a memory device 105. The memory device 105 is an external memory device which is controlled by the memory control unit 104 and stores data. The interrupt reception circuit 106 receives a timing signal from an image data output apparatus 108. The inter-chip interface 107 serves as an interface used for inter-chip bus connection on the data control apparatus 101 side.

The image data output apparatus 108 serving as an information processing apparatus performs printing and output based on print data. The image data output apparatus 108 includes an inter-chip interface 109, an image data output interface 110, an image data output control unit 111, a DMA unit 112, an L1 transition request circuit 113, and a selection circuit 114.

The inter-chip interface 109 serves as an interface used for inter-chip bus connection on the image data output apparatus 108 side. The image data output interface 110 outputs image data to a print engine (not shown). When the remaining data amount of a buffer within the image data output interface 110 becomes equal to or smaller than a preset threshold as will be described with reference to FIG. 11, the image data output interface 110 outputs a DMA transfer request to the DMA unit 112.

The image data output control unit 111 controls each component of the image data output apparatus 108, and the print engine (not shown). The DMA unit 112 reads out data necessary for printing from the memory device 105 connected to the data control apparatus 101, and provides data to the image data output interface 110. Upon receiving a request from the DMA unit 112, the L1 transition request circuit 113 requests to perform transition of the inter-chip interface 109 to the L1 state. The selection circuit 114 selects image data to be input to the image data output interface 110.

Figure 9:
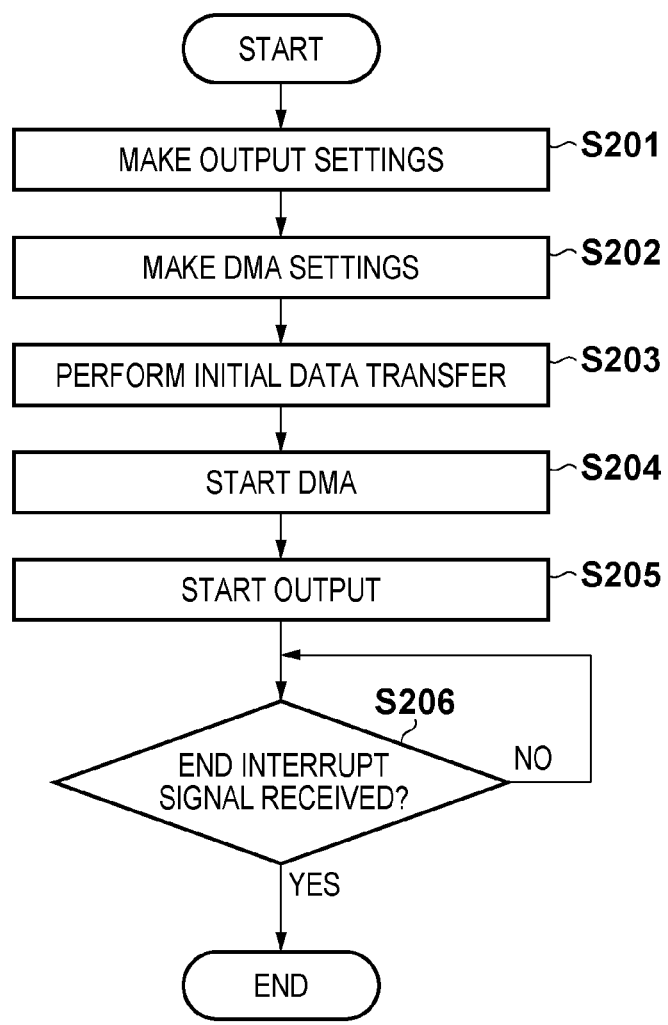
FIG. 9 is a flowchart for explaining an overview of an operation on the control side according to the present invention.
Figure 10:
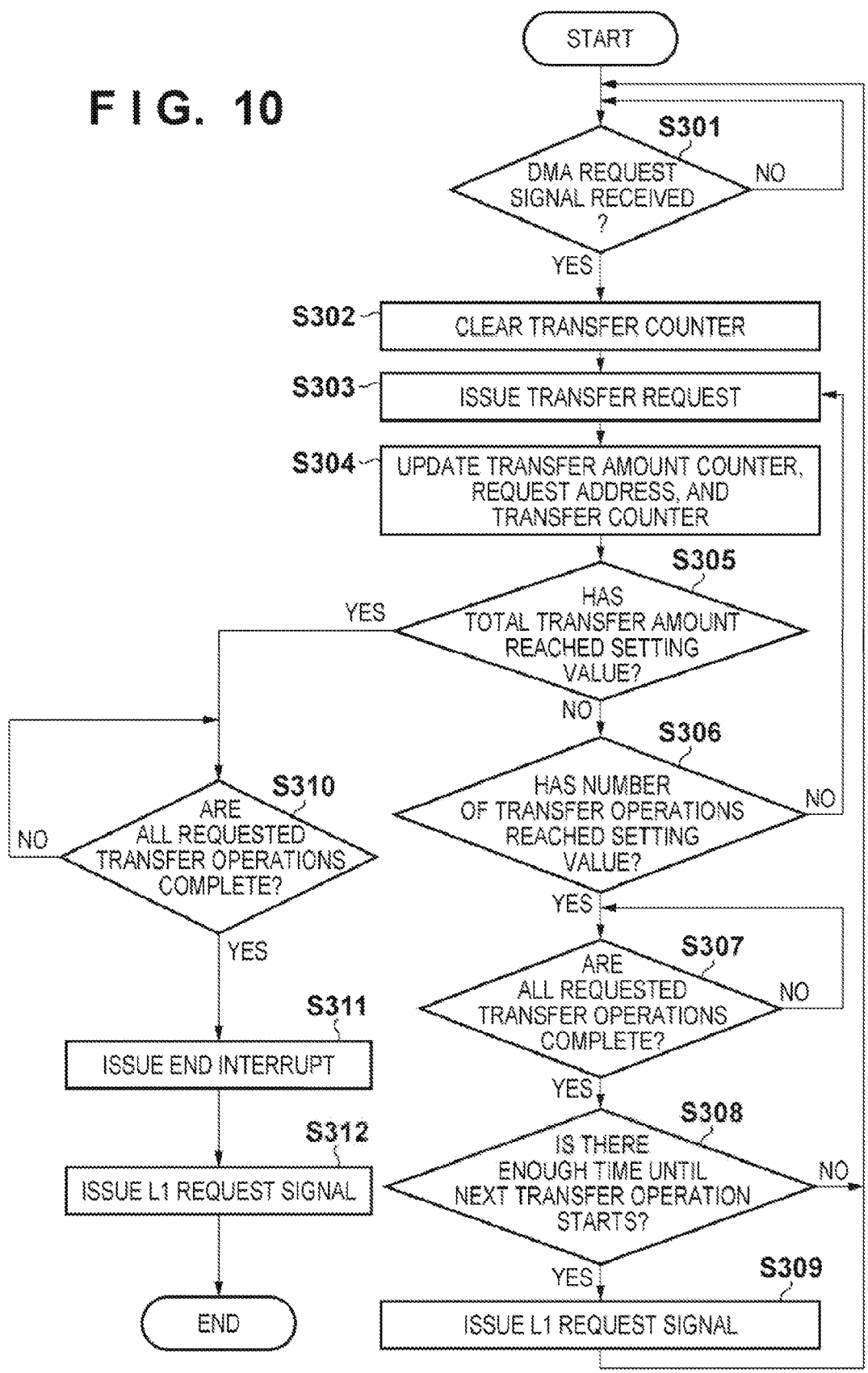
FIG. 10 is a flowchart for explaining an overview of the operation of a DMA unit.
Figure 11:
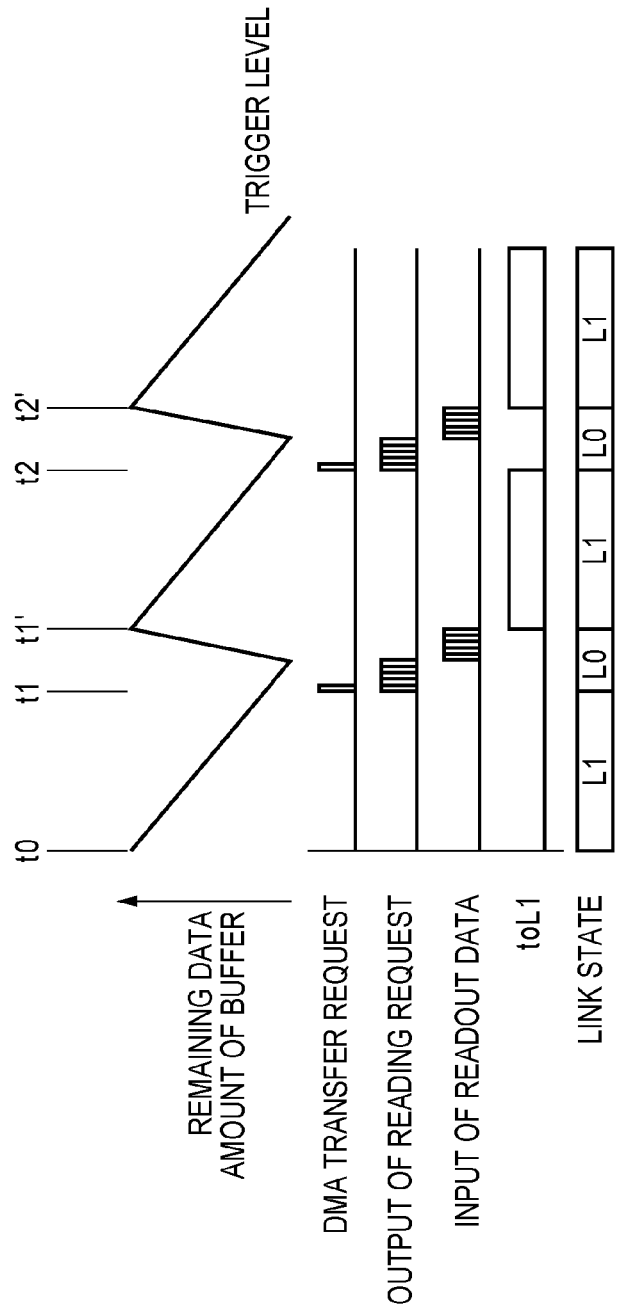
FIG. 11 is a timing chart showing a timing relationship assumed by the operation of the flowcharts of FIGS. 9 and 10.

FIG. 11 is a timing chart showing a timing relationship assumed by operations illustrated in the flowcharts of FIGS. 9 and 10.

FIG. 11 shows a remaining data amount accumulated in a buffer included in the image data output interface 110, a DMA transfer request from the image data output apparatus 108 as the receiving side, a transfer request command from the DMA unit 112, reception data, and an L1 transition request signal. The remaining data amount of the buffer in the image data output interface 110 gradually decreases from a time t0. At a time t1, the image data output apparatus 108 as the receiving side sends a DMA transfer request. The DMA unit 112 issues a transfer request command, and receives data from the data control apparatus 101 as the transmitting side. Upon receiving the data, the remaining data amount of the buffer in the image data output interface 110 starts to increase. At a time t1', an L1 transition request signal is generated to transit from the L0 state to the L1 state. During transition to the L1 state, data are sequentially output, and the remaining data amount of the buffer gradually decreases. After that, the same processing is repeated.

A processing procedure by the data control apparatus 101 and a processing procedure when the image data output apparatus 108 performs a print operation will be explained with reference to the flowcharts of FIGS. 9 and 10.

Based on a data transfer amount and an output rate, an information processing apparatus (the image data output apparatus 108) according to this embodiment calculates the first time from when transfer from a connected data control apparatus is completed until a next transfer operation starts. If, when transfer is completed, the first time is longer than the second time obtained by calculating the sum of the time required for transition of an inter-chip bus connected with the data control apparatus to a power saving mode and the time required to return from the power saving state, the information processing apparatus determines that there is enough time, and causes the inter-chip bus to transit to the power saving mode. Practical processing in changing to a power saving state will be explained below.

In step S201 of FIG. 9, the data control apparatus 101 sets, in the image data output apparatus 108, various kinds of information (a paper size, color, settings necessary for the DMA unit 112, and the like) of an image to be printed.

In step S202, the data control apparatus 101 causes the image data output control unit 111 to set the input selection of the selection circuit 114 to a data reception state from the data control apparatus 101.

In step S203, the data control apparatus 101 transmits data to make an output data buffer (not shown) within the image data output interface 110 full.

In step S204, after making the output data buffer full, the data control apparatus 101 instructs the image data output control unit 111 to switch the input selection of the selection circuit 114 to an input from the DMA unit 112, and then instructs to execute printing.

Upon receiving the printing execution instruction, in step S205 the image data output control unit 111 sends a start instruction to a printing apparatus (not shown), and the image data output interface 110 starts output of image data according to a timing signal input from the printing apparatus.

Once a printing operation starts, the remaining data amount of the image data buffer within the image data output interface 110 gradually decreases, as shown in FIG. 11. When the remaining data amount of the buffer becomes equal to or smaller than a preset threshold (trigger level), the image data output interface 110 outputs a DMA transfer request to the DMA unit 112. Upon receiving the DMA transfer request, the DMA unit 112 transmits, to the data control apparatus 101 via the inter-chip bus within the image data output apparatus 108, a request to transfer a preset amount of image data. At this time, the requested data amount which is requested by the DMA unit 112 for the data control apparatus 101 is preset to satisfy $$\text{requested data amount} \ge \text{image data buffer size} - \text{trigger level}$$

Upon receiving all the requested data, the DMA unit 112 outputs an L1 request signal to the L1 transition request circuit 113. Upon receiving the L1 request signal from the DMA unit 112, the L1 transition request circuit 113 outputs, to the inter-chip interface 109, a toL1 signal for transiting to the L1 state.

Figure 12:
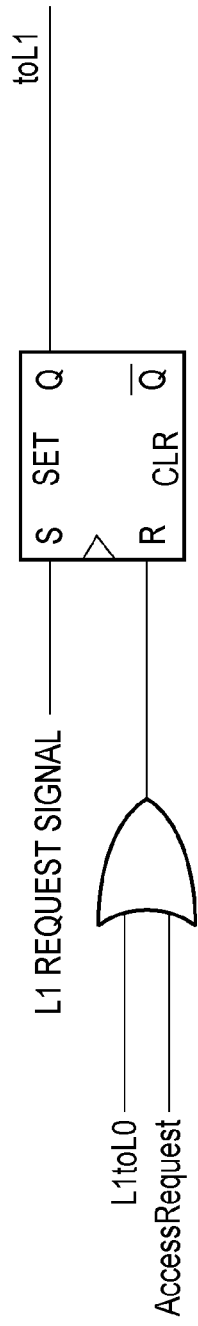
FIG. 12 is a circuit diagram showing an example of an L1 transition request circuit.

FIG. 12 shows an example of the L1 transition request circuit 113. As shown in FIG. 12, in response to an access request (AccessRequest) signal sent from a module of the chip via the inter-chip interface 109 or an access (L1toL0) signal sent from the data control apparatus 101 via the inter-chip interface 107, the L1 transition request circuit 113 cancels an L1 transition request.

In step S206, the CPU 103 determines whether the apparatus 101 has received an end interrupt signal. If the CPU 103 determines that the apparatus 101 has received an end interrupt signal (YES in step S206), it ends the processing; otherwise (NO in step S206), the CPU 103 stands by for reception of an end interrupt signal.

The processing procedure of the DMA unit 112 will be described with reference to the flowchart of FIG. 10. The DMA unit 112 has a transfer counter for counting the number of reading requests executed by one DMA request.

In step S301, the DMA unit 112 determines whether it has received a DMA request signal from the image data output interface 110. If the DMA unit 112 determines to have received a DMA request signal (YES in step S301), the process advances to step S302; otherwise (NO in step S301), the DMA unit 112 stands by for reception of a DMA request signal.

Upon receiving a DMA request from the image data output interface 110, the DMA unit 112 initializes the transfer counter to 0 in step S302. The transfer counter is used to count the number of necessary requests based on a data transfer amount for one operation in the bus within the image data output apparatus 108 connected with the DMA unit 112 in order to cope with the requested data amount to be read out from the data control apparatus 101 by one DMA request.

In step S303, the DMA unit 112 receives the DMA transfer request from the image data output interface 110. The DMA unit 112 sends an image data reading request to the data control apparatus 101 via the bus within the chip.

After issuing the reading request, the DMA unit 112 increases a transfer amount counter (not shown) indicating a transferred data amount by a reading request size in step S304. Furthermore, the DMA unit 112 increments, by 1, the transfer counter used to count the number of transfer operations executed by one DMA transfer request. The DMA unit 112 then updates a reading address value for a next transfer request.

In step S305, the DMA unit 112 determines whether all transfer operations necessary for page printing are complete, that is, whether a total transfer amount reaches a setting value. If the DMA unit 112 determines that the data transfer operations necessary for page printing are not complete (NO in step S305), the process advances to step S306; otherwise (YES in step S305) the process advances to step S310.

In step S306, the DMA unit 112 determines based on the value of the transfer counter whether the number of transfer operations reaches a setting value. If the DMA unit 112 determines that the number of transfer operations reaches the setting value (YES in step S306), the process advances to step S307; otherwise (NO in step S306), the process returns to step S303.

In step S307, the DMA unit 112 determines whether all the requested transfer operations are complete. If the DMA unit 112 determines that the transfer operations are complete (YES in step S307), the process advances to step S308; otherwise (NO in step S307), the DMA unit 112 stands by.

In step S308, the DMA unit 112 determines whether there is enough time until a next transfer operation starts. This determination processing will be described below. The DMA unit 112 refers to the value of an internal timer (not shown). A value which represents, by the clock cycle of a counter, a cycle in which a DMA request is generated is set as a counter initial value in the timer. That is, $$\text{counter initial value} = \text{requested data amount} / \text{data consumption rate}$$

where the data consumption rate is obtained by converting a value determined based on the processing speed of the print engine into a timer clock cycle. Upon receiving a DMA request signal, the timer loads the counter initial value, and decreases the count value by 1 in the clock cycle. When the value becomes 0 or an instruction is received from the DMA unit 112, the timer stops the count operation. When reception of all the requested data is completed, the DMA unit 112 refers to the value of this timer, and compares it with a setting value set in advance.

If it is determined as a result of the comparison that there is enough time until the next transfer operation starts, that is, if it is determined that the value of the timer is larger than the setting value (YES in step S308), the process advances to step S309. Alternatively, if it is determined that there is not enough time until the next transfer operation starts, that is, if it is determined that the value of the timer is equal to or smaller than the setting value (YES in step S308), the process returns to step S301 without outputting an L1 transition request signal.

In step S309, the DMA unit 112 outputs an L1 transition request signal serving as a power saving transition command to the L1 transition request circuit 113, and returns the process to step S301 to receive a next transfer request.

The above-described setting value used to determine the value of the timer counter is set by, for example, the CPU 103 of the data control apparatus 101 via the inter-chip interface. The setting value may be the time required when the inter-chip interface transits to the L1 state and returns from the state to the L0 state, or may be determined by adding, to the time, the time taken to actually read out data from the memory device 105 connected to the data control apparatus 101. The value of the counter indicates a time until a next transfer operation starts.

That is, the length of the first time from when a transfer operation from the connected data control apparatus is completed until a next transfer operation starts, and the length of the second time obtained by calculating the sum of the time required to cause the inter-chip bus connected to the data control apparatus to transit to a power saving state and the time required to return from the power saving state are determined.

Figure 13:
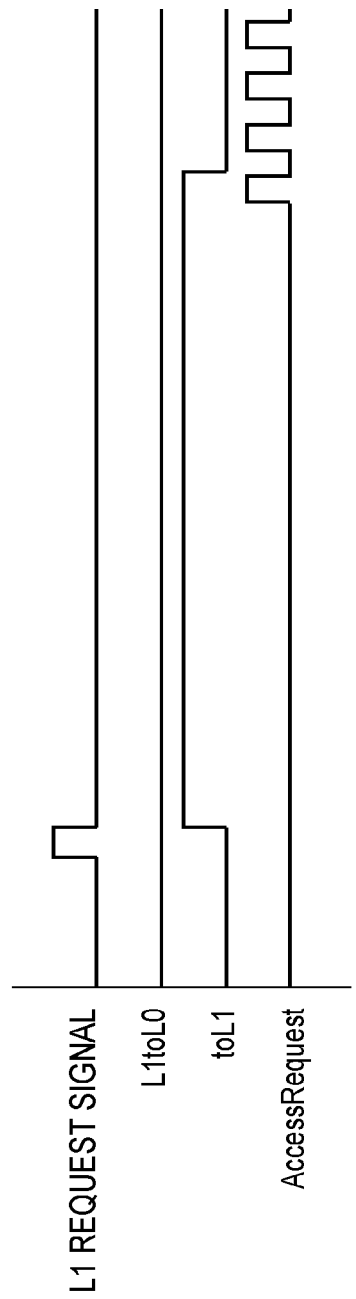
FIG. 13 is a timing chart for explaining the operation of the L1 transition request circuit.

A power saving transition command interface will be described next. In this embodiment, the L1 transition request circuit 113 of the image data output apparatus 108 has the function. As described above, the PCI Express standard has defined that either side may start return from the L1 state as a low power consumption state to the normal state L0. The power saving transition command interface needs to be able to start return from the L1 state to the L0 state in response to reception of a reading request from the DMA unit 112. FIG. 12 shows a practical example and FIG. 13 shows a schematic operation timing chart. FIG. 13 shows a case in which an internal module of the image data output apparatus 108 sends an access request. The power saving transition command interface needs to consider an L0 return signal (L1toL0) by an access request from the data control apparatus 101 as a connection partner and an access request (AccessRequest) signal from an internal module of the image data output apparatus 108. In response to access from the apparatus 101 or 108, the power saving transition command interface cancels a request signal (toL1) for performing transition of the inter-chip interface 109 to the L1 state. FIG. 12 shows a case in which an internal module of the image data output apparatus 108 sends an access request.

Since it is possible to acquire the image data output rate of the image data output apparatus 108, and a transition time/return time to/from the L1 state of the inter-chip interface and a DMA transfer amount are known, the timer has a transfer interval prediction function. By comparing the setting value with the remaining time of the timer after transfer is completed, the DMA unit 112 determines whether to perform transition.

As described above, according to this embodiment, it is possible to quickly transit to a state in which the power saving effect is higher while data transfer is not performed.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-268753 filed Dec. 1, 2010, and No. 2011-053558 filed Mar. 10, 2011, which are hereby incorporated by reference herein in their entirety.

What is claimed is:

1. A data transmission apparatus comprising:
a memory;
a timing instruction unit which indicates a start timing of a series of data outputs of a predetermined amount of data from said memory;
a first interface which performs the series of data outputs of data stored in said memory according to the start timing indicated by said timing instruction unit;
a second interface which transfers the data from said first interface to a buffer; and
a control unit which issues a command to perform transition of said first interface and said second interface to a power saving state if a time period from a complete timing of the series of data outputs to a start timing of a next series of data outputs indicated by said timing instruction unit is longer than a sum of a time required to perform transition of said first interface and said second interface to the power saving state and a time required to return from the power saving state,
wherein the timing instruction unit determines the predetermined amount of data and a transfer interval in accordance with a size of the buffer and an output rate, and indicates the start timing in accordance with the determined transfer interval.

2. The apparatus according to claim 1, wherein said control unit issues a command to transit to the power saving state when a time until the data output start timing indicated by said timing instruction unit is longer than the sum of the required times.

3. The apparatus according to claim 1, wherein said first interface and said second interface comply with a PCI Express standard.

4. The apparatus according to claim 3, wherein the power saving state is an L1 state according to the PCI Express standard.

5. The apparatus according to claim 1, further comprising
an output unit which outputs a request signal for performing transition of said first interface and said second interface to the power saving state based on the command issued by said control unit, and
a block unit which blocks, while the request signal is output, a request for said second interface other than a request to transit to the power saving state.

6. The apparatus according to claim 1, further comprising
a third interface which outputs the data of the buffer,
wherein said control unit acquires the required times from said third interface.

7. A non-transitory storage medium storing a program for causing a computer to function as each unit of a data transmission apparatus according to claim 1.

8. A data transmission apparatus comprising:
a memory;
an issuance unit which issues a signal indicating a start timing of outputting data from said memory;

an interface which outputs data stored in said memory to an external apparatus based on the signal issued by said issuance unit; and a control unit which controls transition to a power saving state in said interface based on the data output start timing indicated by the signal and a state transition required time associated with the power saving state in said interface, wherein the issuance unit determines a transfer interval of the data in accordance with a data output rate and a size of a buffer of the external apparatus, and issues the signal in accordance with the determined transfer interval.

9. A control method for a data transmission apparatus which includes a memory, a first interface, and a second interface, comprising:

indicating a start timing of a series of data outputs of a predetermined amount of data from the memory;

causing the first interface to perform the series of data outputs of data stored in the memory based on the start timing;

causing the second interface to transfer the data from the first interface to a buffer; and issuing a command to perform transition of the first interface and the second interface to a power saving state if a time period from a complete timing of the series of data outputs to a start timing of a next series of data outputs indicated in the indicating is longer than a sum of a first required time required to perform transition of the first interface and the second interface to the power saving state, and a second required time required to return the first interface and the second interface from the power saving state, wherein the timing instruction unit determines the predetermined amount of data and a transfer interval in accordance with a size of the buffer and an output rate, and indicates the start timing in accordance with the determined transfer interval.

10. A control method for an information processing apparatus which includes a memory, an issuance unit for issuing a signal indicating a start timing of outputting data from the memory, and an interface for outputting data stored in the memory to an external apparatus based on the signal issued by the issuance unit, the method comprising:

controlling transition to a power saving state in the interface based on the data output start timing indicated by the signal, and a state transition required time associated with the power saving state in the interface, wherein the issuance unit determines a transfer interval of the data in accordance with a data output rate and a size of a buffer of the external apparatus, and issues the signal in accordance with the determined transfer interval.

11. An information processing apparatus for processing data transferred from a data control apparatus, comprising:

a request unit which requests the data control apparatus to transfer data;

an output unit which processes and sequentially outputs the transferred data;

a calculation unit which calculates, based on a transfer amount of data requested by said request unit and an output rate output by said output unit, a first time from when the transfer operation is completed until a next transfer operation starts;

a comparison unit which compares the first time with a second time obtained by calculating a sum of a time required to perform transition of an inter-chip bus connected with the data control apparatus to a power saving state and a time required to return from the power saving state; and a changing unit which performs, when said comparison unit determines that the first time is longer than the second time, transition of the inter-chip bus to the power saving state.

12. The apparatus according to claim 11, further comprising an accumulation unit which receives and accumulates the data transferred from the data control apparatus, wherein when said output unit outputs the data and then a remaining data amount of a buffer of said accumulation unit becomes equal to or smaller than a threshold, said request unit requests the data control apparatus to transfer data.

13. A control method for an information processing apparatus which processes data transferred from a data control apparatus, comprising:

requesting the data control apparatus to transfer data;

processing and sequentially outputting the transferred data;

calculating, based on a transfer amount of data requested in the requesting and an output rate output in the outputting, a first time from when the transfer operation is completed until a next transfer operation starts;

comparing the first time with a second time obtained by calculating a sum of a time required to perform transition of an inter-chip bus connected with the data control apparatus to a power saving state and a time required to return from the power saving state; and performing, when it is determined in the comparing that the first time is longer than the second time, transition of the inter-chip bus to the power saving state.

14. The apparatus according to claim 11, wherein the inter-chip bus complies with a PCI Express standard.

15. The apparatus according to claim 11, wherein the power saving state is an L1 state according to the PCI Express standard.

16. A non-transitory storage medium storing a program for causing a computer to function as each unit of an information processing apparatus according to claim 11.

* * * * *